United States Patent [19]
Cherrin

[11] 3,974,311
[45] Aug. 10, 1976

[54] SHIPPING DOCUMENTS DEVICE

[75] Inventor: Phil Cherrin, Huntington Woods, Mich.

[73] Assignees: Abe Cherrin; Lem Cherrin, Southfield, Mich. ; part interest to each

[22] Filed: Jan. 13, 1975

[21] Appl. No.: 540,698

Related U.S. Application Data

[60] Division of Ser. No. 294,627, Oct. 3, 1972, Pat. No. 3,874,893, which is a continuation-in-part of Ser. No. 99,213, Dec. 17, 1970.

[52] U.S. Cl. ................................. 428/43; 40/2 R; 40/10 R; 40/10 D; 40/125 A; 40/135; 283/18; 283/19; 427/207; 427/201; 427/205; 427/333; 427/336; 427/337; 427/402; 427/407; 428/195; 428/204; 428/207; 428/343; 428/352; 428/354

[51] Int. Cl.² ..................... C09J 7/02; G09F 3/02; G09F 3/04; G09F 7/12

[58] Field of Search ................. 40/2 R, 10 R, 10 D, 40/125 A, 135; 283/18, 19; 427/207, 258, 261, 265, 271, 333, 336, 337, 402, 407; 428/195, 204, 207, 343, 352, 354, 43

[56] References Cited
UNITED STATES PATENTS 3,159,930 12/1964 Allen et al. ...................... 40/2 R
3,874,893 4/1975 Cherrin ........................... 40/2 R

*Primary Examiner*—J. C. Cannon
*Attorney, Agent, or Firm*—Harness, Dickey & Pierce

[57] ABSTRACT

A tape product for use in attaching shipping documents (such as packing slips, sales slips, invoices, letters) or the like to the outside of various containers with the tape being transparent and including a sticky adhesive material on the back side thereof with one or more separate coated layers also on the back side of the tape, said coated layers comprising in one embodiment a first layer of backward printed letters which are readable when the tape is in position on a container and a second layer comprised of a contrasting background color which facilitates the reading of the letters when the tape is in position on the container, in another embodiment a single layer of transparent coating material, and in other embodiments opaque and transparent layers used in various combinations with one another and in differing areas and number of layers, such layers rendering a portion of the adhesive material nonsticky so that documents may be retained without tearing or sticking to the tape product; and, the method of preparing such tape products.

14 Claims, 13 Drawing Figures

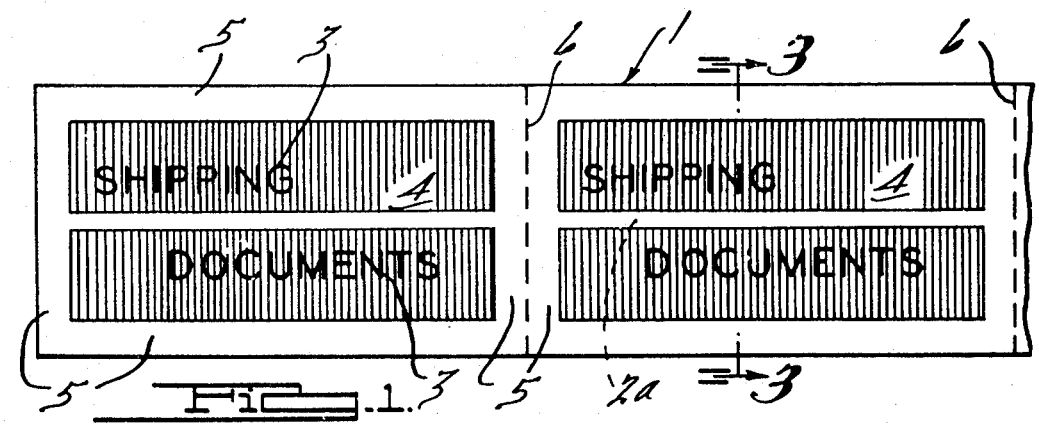
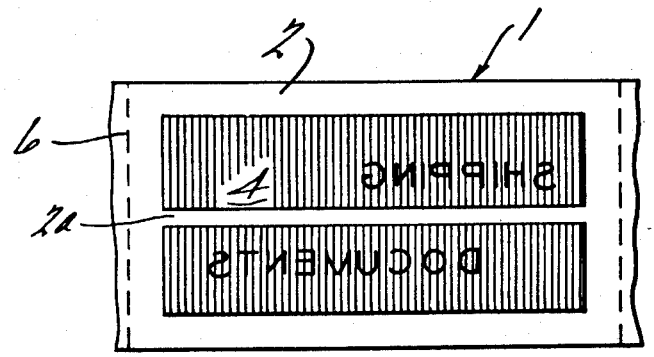
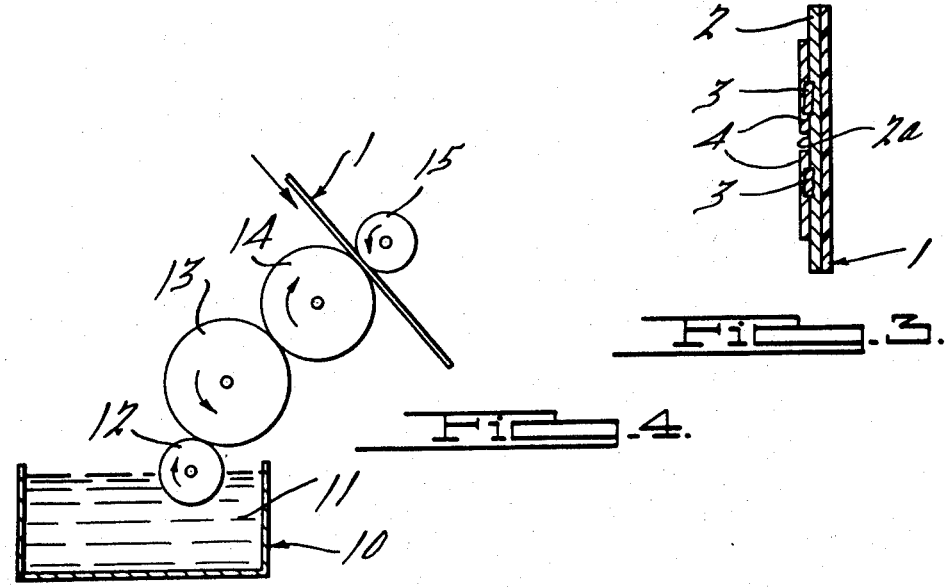

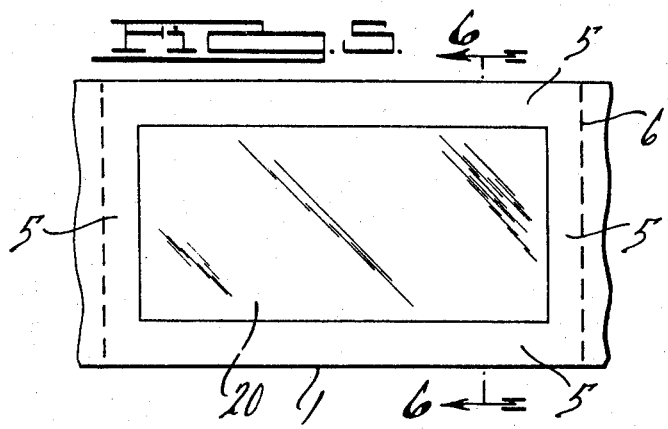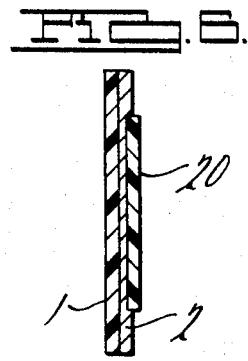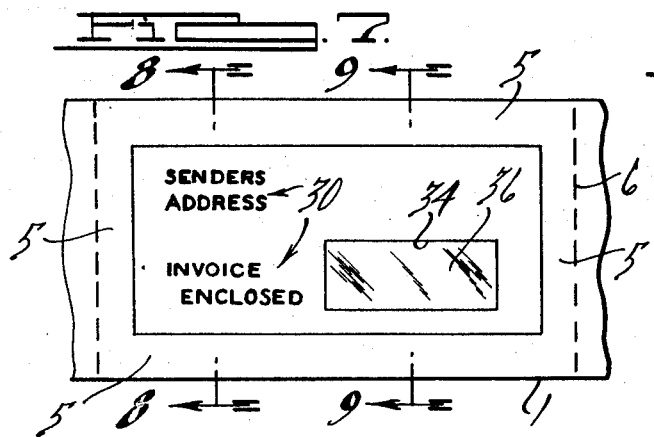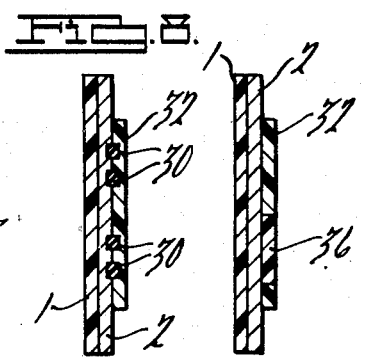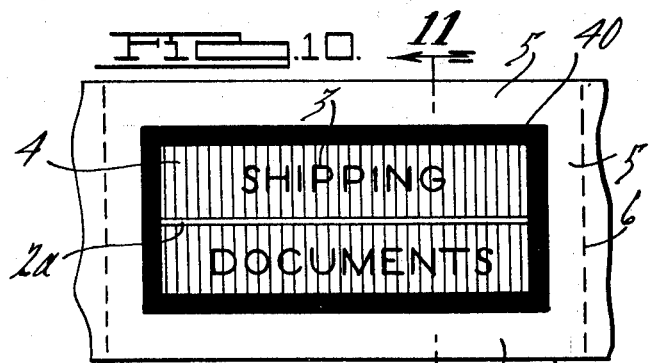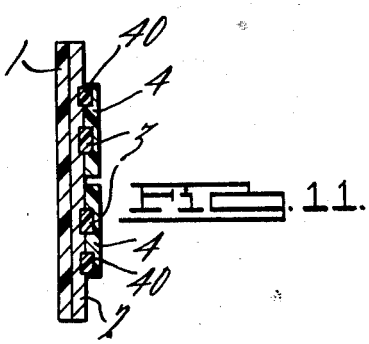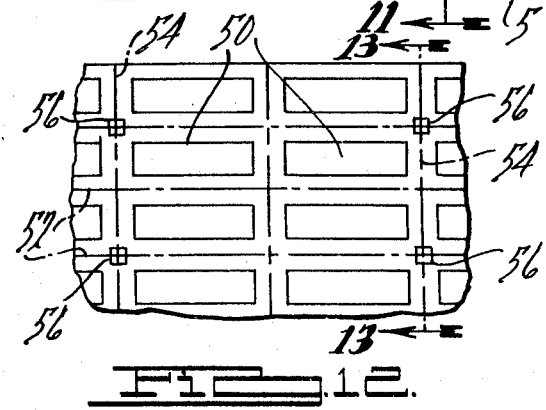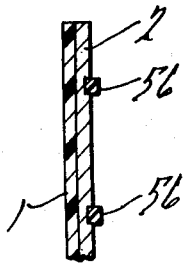

SHIPPING DOCUMENTS DEVICE

This is a division of application Ser. No. 294,627, filed Oct. 3, 1972, now U.S. Pat. No. 3,874,893, which in turn is a continuation-in-part of application Ser. No. 99,213 filed Dec. 17, 1970 for Shipping Documents Device and Method.

BACKGROUND OF THE INVENTION

This invention broadly relates to a novel tape product and its method of preparation.

The state of the patented art relating to this invention developed by the Patent Office with respect to the parent application and by applicant in a preliminary search is as follows: U.S. Pat. Nos. Goodsell et al. 1,071,226, Wright et al. 1,679,699, Humphner 1,922,767, Bronfman 2,302,179, Emmey et al. 2,439,082, Leander 2,603,899, Brewster 2,648,924, Walsh 2,671,678, Avery 2,783,172, Tobey 2,975,091, Allen et al. 3,159,930, Howard 2,307,406, Birch 2,598,755, Harris 2,767,495, Sproull 2,996,177, Vosbikian 3,370,365, Lones 3,386,846, Sandford 3,327,416, British patent 1,099,234, German patent 1,289,515.

The object of this invention is to provide a novel improved tape product and its method of preparation.

Another object of the present invention is to provide a new, improved tape product for fastening shipping documents and the like to the sides of various shipping containers in an easy manner. A related object resides in the provision of perforations at intervals along the tape so that short segments (individual units) of the tape product can be readily separated and used.

Another object of this invention concerns the provision of an improved adhesive device for securing documents to a container or the like which does not suffer the disadvantage of fully enclosed film envelope devices which trap air when they are sealed and thus project from the side of the container where they are subject to damage and accidental removal.

Another object resides in the provision of an improved tape product having on one side one portion which is tacky and a second portion which is substantially nontacky and a method of fabrication thereof which does not require the use of expensive and difficult adhesive zone coating operations. A related object concerns the provision of one or more coatings over the tacky adhesive surface to render it nontacky in preselected areas.

Another object of this invention is to provide an unexpectedly advantageous tape product which contains a plurality of different coated layers overlying the adhesive-containing side of the tape, and wherein at least one of said coated layers is formed by flexographic printing.

Another object of this invention resides in the provision of an improved tape product having a tacky peripheral area and a substantially nontacky central area for holding a document or the like on a shipping container without the document becoming adhesively affixed to the tape product. A related object concerns the provision of means permitting at least a portion of the document to be visible through the tape product.

Another related object is to form the nontacky central document holding area with reversely printed indicia covered by an opaque coating of contrasting background color, the indicia and coating rendering the area nontacky so that the documents do not stick to or become torn by adhesive in the holding area. Yet a further related object resides in the provision of a small tacky area in the holding area to temporarily secure the document to the tape product during affixing to a container.

Another object of the present invention is to provide a novel and improved tape product which can be in roll form for easy dispensing usage.

Another object of the present invention is to provide an improved document securing device which may be used to secure shipping lists or other shipping documents, invoices and the like to shipping containers, and which provides a direct view of indicia provided on such documents or which has its own indicia or which has both.

Another object of the present invention is to provide a new and improved tape product which is highly economical to prepare.

Another object of this invention resides in the provision of an improved document holding device having a nontacky portion adjacent a corner thereof which serves the dual function of providing a lift-off portion to facilitate the removal of a label from a container as well as an eye-mark to facilitate manufacture of the product.

Other objects, features and advantages of the present invention will become apparent from the subsequent description and the appended claims taken in conjunction with the accompanying drawings.

BRIEF DESCRIPTION OF THE DRAWINGS

FIG. 1 is a view of a first embodiment of the invention showing the front side of several units of the tape product before it is attached to any container;

FIG. 2 is a rear view of a portion of the tape product of FIG. 1 illustrating the backward printed letters which are printed onto the sticky or tacky side of the tape;

FIG. 3 illustrates a cross-sectional view taken along the line 3—3 of FIG. 1;

FIG. 4 illustrates schematically a printing technique for preparing or fabricating the tape product of this invention;

FIG. 5 is a view similar to that of FIG. 1 showing the front side of a second embodiment of the present invention;

FIG. 6 is a cross-sectional view taken along line 6—6 in FIG. 5;

FIG. 7 is a view similar to FIG. 1 of a third embodiment of the present invention;

FIG. 8 is a cross-sectional view taken along line 8—8 in FIG. 7;

FIG. 9 is a cross-sectional view taken along line 9—9 in FIG. 7;

FIg. 10 is a view similar to FIG. 1 of a fourth embodiment of the present invention;

FIG. 11 is a cross-sectional view taken along line 11—11 of FIG. 10;

FIG. 12 is a partial plan view of a further embodiment of the present invention in which a number of tape product units are fabricated at the same time; and FIG. 13 is a sectional view taken along line 13—13 in FIG. 12.

DESCRIPTION OF PREFERRED EMBODIMENTS

Without being limited to the specific form of the invention as is shown in the drawings, FIGS. 1, 2 and 3 illustrate one embodiment of a tape product in accordance with this invention. The tape 1 has on the back side thereof a sticky, adhesive-like material 2. On the back or adhesive side of the transparent tape 1 there are printed the letters designated 3 and these letters during the printing operation are oriented in a backward or reverse relationship as viewed or shown from the back side of the tape specifically in FIG. 2. Overlaying the letters 3 is a contrasting background coloring material designated 4.

The printing of the letters 3 onto the tape 1 is preferably carried out by a flexographic printing operation. The flexographic printing operation is carried out by utilizing an ink fountain 10 (see FIG. 4) and providing a rotating cylinder 12 which picks up the ink 11 from the fountain. The ink for forming the backward printed letters is transferred by a transfer cylinder 13 to a rubber plate on a plate cylinder 14 which is in contact with the backup roller 15. The transparent tape 1 is brought into contact with the rubber plate which has the raised letters thereon such that the letters are printed in backward position onto the adhesive side of the tape 1. The letters which are formed on the adhesive side of the tape cover over the adhesive material 2 which underlies the letters.

Subsequently there is also printed or coated onto the back side of the tape the contrasting background coloring material designated 4. This constrasting color material makes the letters easily readable when viewed from the side of the tape as is shown in FIG. 1. The contrasting background coloring material 4 is applied in a manner such that there is left a border area designated 5 surrounding the letters. This border area designated 5 enable the tape product to be adhered to the side of a shipping container such as a cardboard carton; and, the shipping documents such as invoices, shipping lists, letters, sales slips, or the like may be readily adhered to the side of the container by placing the tape product of this invention over the shipping documents and then adhering the tape product to the side of the container by means of the adhesive material 2 which remains only in the border area 5 of the tape product.

It is also to be noted that printing or coating of the background color material 4 on the sticky side of the tape may be carried out in such a manner as to leave a narrow strip 2a of exposed adhesive material 2. This strip 2a (see FIG. 2) of exposed adhesive material facilitates usage of the tape product herein, in that it makes it possible for the user to take a folded document and temporarily adhere it to the sticky side of the tape on the exposed adhesive strip 2a and then both hands are free to subsequently adhere the tape product to the side of a shipping container or the like.

Perforations 6 may also be formed at predetermined intervals along the length of the tape 1 so that segments of the tape can be readily separated, one from the other, for usage.

The coating materials used in this invention for forming the printed letters may satisfactorily be either a dye material or a pigmented material. In like fashion the coating material used to form the contrasting background color may also be either a dye or pigmented material.

It is to be noted in accordance with this invention that the printed letters and the contrasting background color material cover over all of the adhesive material on the back side of the tape except for optional strip 2a and a border area 5 which is left to adhere the tape to the side of a container and thus to fasten or attach the shipping documents to the side of the container, underneath the colored area designated 4.

In FIG. 5 and 6 there is illustrated a second embodiment of the tape product which is generally the same as that described except that instead of having two layers of printing or coating on the sticky side of the tape there is provided a centrally disposed single layer 20 of transparent coating material. Coating 20 may be of any suitable transparent lacquer (such as an overprint lacquer) or other suitable printable or coatable material which is transparent in combination with the tape and which substantially removes or covers the tackiness of the area of the sticky side of the tape on which it is disposed. The tape of this embodiment is useful in connection with the use of shipping documents which have written thereon the message to be shown, such as "SHIPPING DOCUMENTS", the address of the person to whom the container is to be shipped, or the like. As in the previous embodiment, the individual units of tape product contain a full border 5 of tacky adhesive in order to affix the documents to the container. Perforations 6 may be provided if desired. Also, although not shown, opaque borders and/or indicia or letters may be applied on or beneath layer 20.

A third embodiment, comprising features of both the first and second embodiments, is illustrated in FIGS. 7, 8 and 9. In this embodiment tape 1 has a layer of adhesive 2 on which is printed or coated reversely oriented opaque or contrasting letters or indicia 30, applied in the same manner and with the same material as that described above with respect to letters 3. Overlaying indicia 30 is a layer 32 of opaque and/or contrasting background coloring material, the latter being spaced inwardly from all sides of the individual units of tape product to provide a peripheral zone 5 of adhesive for affixing the documents to the container. If desired, layer 32 may be provided with an opening 34 defining an area which may be printed or coated with a layer 36 of transparent material of the same type as indicated at 20 with respect to the second embodiment. Layer 36 may be applied only in opening 34 (as shown) or may be applied over a part or all of layer 32, whichever is desired. Any type of lettering or indicia may also be applied if desired, that shown being merely exemplary, or it may be omitted. In the embodiment shown, the transparent center provides an area for the name of the addressee to show through from the shipping document, letter, sales slip, invoice or the like secured to the container by the tape. As in the previous embodiment, within the tacky periphery 5 the entire central area of the article is rendered substantially non-tacky by the layers disposed thereon to prevent possible destruction of the shipping documents when they are removed from the container and separated from the tape. Perforations 6 may be provided if desired. This embodiment can also be used in those applications where the present practice is to use an envelope bearing first class postage affixed to the outside of a container mailed at a lower rate postage.

In FIGS. 10 and 11 there is illustrated a fourth embodiment of the present invention which is substantially the same as the first embodiment, differing only in the provision of a contrasting or opaque border 40 which is printed or coated at the same time as letters 3 using the same ink or coating material. This is a further example of the variance in design possible without requiring additional fabricating operations. Again perforation 6 may be provided if desired.

A further embodiment of the invention is illustrated in FIGS. 12 and 13. This embodiment is particularly applicable, but not necessarily limited, to fabrication operations wherein the product is printed, etc. in multiple widths, and concerns the provision of a zone or area of opaque coating which serves the dual purpose of acting as an eye-mark during fabrication to facilitate alignment of the coating and forming apparatus and after fabrication to facilitate dispensing from an automatic dispensing machine, as well as acting as a non-tacky lift-off tab to facilitate removal of the device from a container to which it is affixed. As best seen in FIG. 12, there is illustrated the outline of a number of in-process units 50 of the tape product (any embodiment desired) defined on a multiwidth tape by longitudinally extending phantom lines 52 and transversely extending phantom lines 54. Disposed at alternate intersections of lines 42 and 54 are discrete opaque portions 56 each of which is disposed in part on the adjacent corner of each of the four adjacent units. Portions 56 may be coated or printed on the tape separately from other printing operations, or at the same time an opaque coating is being applied, such as letters 3 or 30, or background 4, or the like. During fabrication they can be used as eyemarks to facilitate the alignment of printing, slitting, perforating, et. When units 50 are subsequently separated, such as by slitting along lines 52 and tearing (with perforations) or cutting (without perforations) along lines 54, each will have a lift-off tab which is relatively non-tacky so as to facilitae manual grasp and removal of the document securing device from the container.

Although the present invention has been described for use in affixing documents or the like to a container, obviously it can be used to affix them to anything, such as directly to an object being shipped or in-process or in inventory, to a vehicle, or to whatever is desired. Furthermore, even though a tranpsparent tape base has been illustrated in connection with all the embodiments, it will be appreciated that in those applications where no lettering or see-through capability is required on opaque tape can be used.

Removal of the stickiness or tackiness of the adhesive, as the expression is used herein, includes rendering the adhesive substantially non-tacky by covering it with a non-tacky coating and/or by a coating which through solvent or other action causes the adhesive to lose most of its adhesive properties. It shold also be noted that in each of the sectional views, i.e. FIGS. 3, 6, 8, 9, 11 and 13, the thicknesses of the various materials, and particularly the layers of coating thereon, are greatly exaggerated in order to diagramatically illustrate the manner in which the prodict is fabricated. As a practical matter, in most applications the layers of coating or ink are no thicker than the ink on a normal printed page and therefore would not appear as shown in these sectional views. In fact, one of the advantages of the present invention resides in the fact that separate distinct layers of material, such as layers or sheets of paper, plastic film, foil or the like, are not required for the purpose of providing indicia and/or removing tackiness.

In all of the embodiments disclosed the printing techniques illustrated in FIG. 4 may be used.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

I claim:

1. An article for attaching documents and the like to the outside of containers, and for other uses, comprising: a sheet of materia; a first coating disposed on substantially the entirety of one side of said sheet, said first coating consisting of a normally sticky adhesive material; a second coating disposed on said side of said sheet in a first area; and a third coating disposed on said side of said sheet in a second area, said first and second areas being spaced inwardly from the peripheral edges of said sheet, said second and third coatings each consisting of material which substantially removes the stickiness of said first coating, said second coating being of a predetermined coloring material, said third coating being of a visually contrasting material, one of said second and third coatings being in the form of reversely arranged indicia.

2. An article as claimed in claim 1, wherein said second coating is disposed in part over said third coating.

3. An article as claimed in claim 1, wherein said third coating is disposed in part over said second coating.

4. An article as claimed in claim 1, wherein said first and second areas are mutually exclusive of one another.

5. An article according to claim 1, in which said third coating is a coloring material.

6. An article according to claim 1 in which said third coating is a transparent material.

7. An article according to claim 1, said second coating being in a central area of said sheet, said third coating entirely covering said second coating.

8. An article according to claim 1, further provided with means defining a zone in the central portion of the exposed surface of said first coating which is not covered by said second and third coatings.

9. An article as claimed in claim 8, wherein said zone is of a relatively narrow elongated configuration.

10. An article according to claim 1 in which said article forms a portion of a transparent tape product.

11. The product of claim 10, wherein, the background color means which overlays the printed letters fully covers the adhesive material except for the border area of remaining sticky material.

12. The product of claim 10, wherein, said tape product is prepared in the form of a roll of tape to facilitate usage thereof.

13. The product of claim 12, wherein, said tape product is perforated at predetermined intervals such that one and more pieces of the tape can be easily severed for usage from the remaining tape.

14. The product of claim 13, wherein, said printed letters are flexographically printed by, utilizing an ink fountain, providing a rotating cylinder which picks up the ink, transferring the ink to a rubber plate on a plate cylinder which is in contact with a back-up roller, bringing the tape into contact with the rubber plate, and hot-air drying the tape.

* * * * *